US011885509B2

(12) United States Patent
Leckinger et al.

(10) Patent No.: US 11,885,509 B2
(45) Date of Patent: Jan. 30, 2024

(54) THERMAL SOLAR ASSISTED WATER HEATING SYSTEM

(71) Applicant: FAFCO INCORPORATED, Chico, CA (US)

(72) Inventors: Robert Leckinger, Chico, CA (US); Alexander P. Ward, Chico, CA (US)

(73) Assignee: FAFCO INCORPORATED, Chico, CA (US)

( * ) Notice: Subject to any disclaimer, the term of this patent is extended or adjusted under 35 U.S.C. 154(b) by 38 days.

(21) Appl. No.: 17/513,837

(22) Filed: Oct. 28, 2021

(65) Prior Publication Data
US 2022/0136711 A1 May 5, 2022

Related U.S. Application Data

(60) Provisional application No. 63/107,298, filed on Oct. 29, 2020.

(51) Int. Cl.
*F24D 19/10* (2006.01)
*F24D 17/00* (2022.01)
(Continued)

(52) U.S. Cl.
CPC ....... *F24D 19/106* (2013.01); *F24D 17/0021* (2013.01); *F24D 17/0068* (2013.01);
(Continued)

(58) Field of Classification Search
CPC ............... F24D 19/106; F24D 19/1063; F24D 17/0068; F24D 17/02; F24S 40/60; F24S 50/00; Y02B 10/20
See application file for complete search history.

(56) References Cited

U.S. PATENT DOCUMENTS 2,575,478 A * 11/1951 Wilson .................... F24S 10/00
126/643
10,381,500 B2  8/2019 Rubio et al.
(Continued)

FOREIGN PATENT DOCUMENTS

CN         103954068 A     7/2014
WO      WO2010-016988 A1   2/2010
WO      WO2010-148137 A2  12/2010

OTHER PUBLICATIONS

International Search Report and Written Opinion for PCT/US2021/057154, dated Feb. 16, 2022.

*Primary Examiner* — Frantz F Jules
*Assistant Examiner* — Martha Tadesse

(57) ABSTRACT

A solar thermal assisted water heating system includes a thermal collector comprising a plurality of fluid channels configured to collect heat from a surface of a photovoltaic module, a drain-back tank coupled to the thermal collector, a first pump coupled to the drain-back tank and configured to pump fluid from the drain-back tank to the thermal collector, a first heat exchanger configured to receive fluid from the thermal collector, a heat pump coupled to the first heat exchanger and configured to remove heat from the fluid and heat water with the removed heat, and a controller configured to control the first pump and heat pump. The system may include a photovoltaic module and a hot water tank. These systems improve the efficiency of water heating, and the drain-back tank may serve as a thermal battery that stores heat and provides the stored heat when environmental temperatures decrease.

20 Claims, 9 Drawing Sheets

(51) Int. Cl.
*F24D 17/02* (2006.01)
*G06Q 50/06* (2012.01)

(52) U.S. Cl.
CPC ......... *F24D 17/02* (2013.01); *F24D 19/1063* (2013.01); *F24D 2200/02* (2013.01); *F24D 2200/14* (2013.01); *F24D 2200/32* (2013.01); *F24D 2220/0207* (2013.01); *G06Q 50/06* (2013.01)

(56) References Cited

U.S. PATENT DOCUMENTS

| | | | | |
|---|---|---|---|---|
| 2010/0031953 | A1* | 2/2010 | Penev | F24D 17/0021 165/45 |
| 2011/0094498 | A1* | 4/2011 | Newman | F24S 40/60 126/585 |
| 2011/0203572 | A1* | 8/2011 | Jackman | F24D 11/003 126/714 |
| 2013/0312671 | A1* | 11/2013 | Deivasigamani | G05D 23/1919 122/1 C |

* cited by examiner

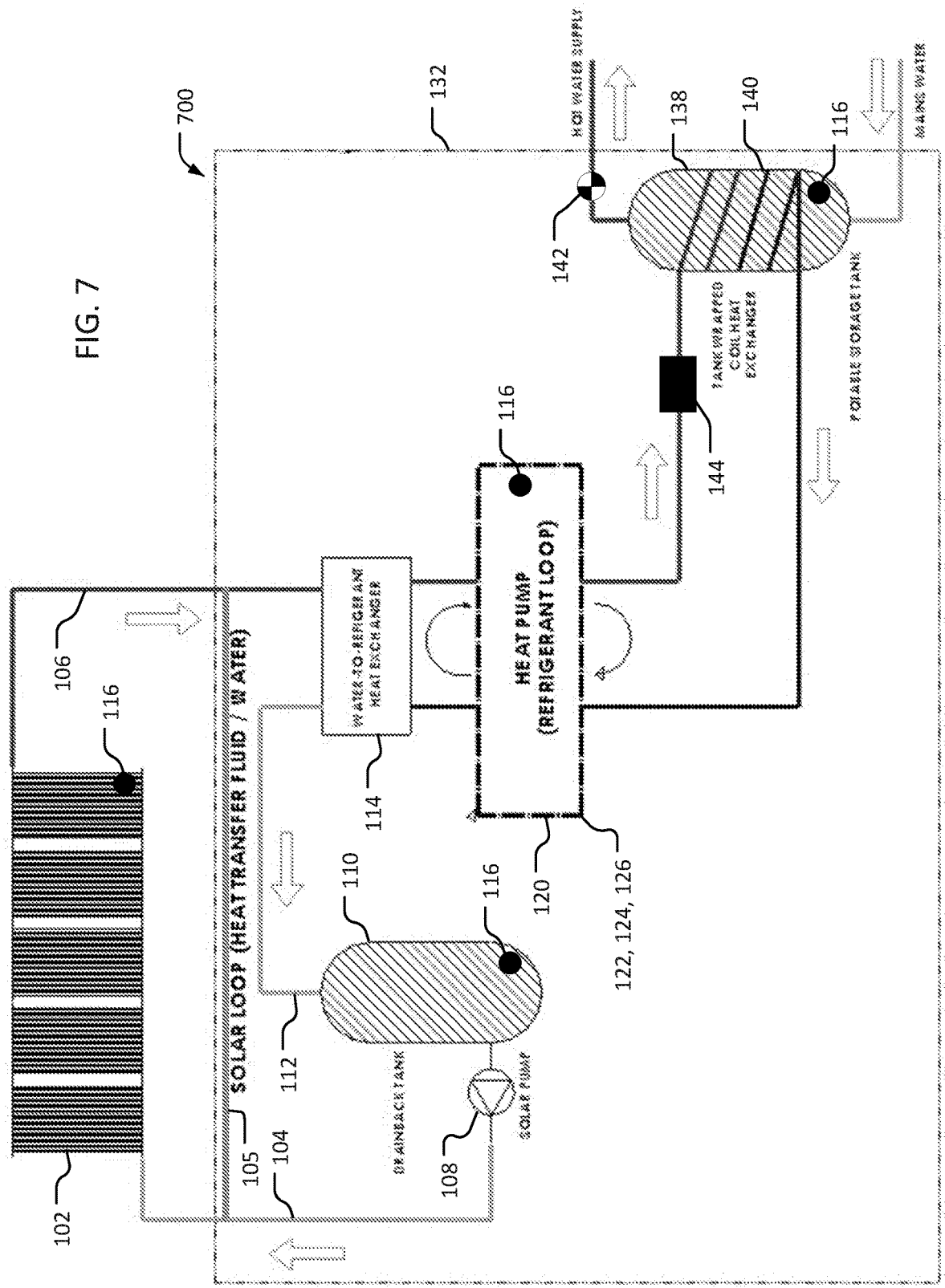

THERMAL SOLAR ASSISTED WATER HEATING SYSTEM

RELATED APPLICATIONS

This application claims priority to U.S. Application No. 63/107,298, filed Oct. 29, 2020, which is incorporated herein by reference in its entirety.

BACKGROUND

Water heating is accomplished by a variety of technologies. Many of these technologies require significant amounts of fossil fuels. A few sustainable technologies exist, including traditional solar thermal systems and heat pumps.

Solar thermal water heating solutions have been used for decades and have proven very effective at providing reliable hot water. Over the years, the technology has shown to be too expensive to incent consumers to invest, while solar electricity continues to gain favor.

Heat pumps are designed to utilize the Carnot cycle, taking advantage of the evaporation and condensing temperatures of a refrigerant. This allows diffuse energy to be concentrated and utilized in applications where the energy is required at different temperatures. Water heating is a fairly high temperature load and the environment that a conventional heat pump can capture heat from is very diffuse. Heat pumps are available in configurations with various heat sources, including air, ground or water.

While heat pumps have been utilized in many markets, they are now becoming popular for domestic water heating. Some manufacturers have opted to use heat pumps as a whole-home solution that performs space heating, water heating and space cooling all in one unit. Whole-home systems are an effective use of energy, but they are cost prohibitive, will take time to adopt, and still require a significant amount of electricity to operate.

Air-source heat pumps bridge the gap, using atmospheric heat to fulfill much of the water heating energy load. These commercially available heat pumps are produced in a form-factor that is similar to conventional water heaters, with the same electrical and plumbing connections. Designing new products with the most similarities to conventional products will expedite adoption by trade professionals.

Air-source heat pumps for heating water have several disadvantages. When an air-source heat pump is located in a conditioned space during the winter, the heat pump becomes parasitic to space heating, increasing the load of space heating. If the ambient heat available is too low, the heat pump is inefficient, and the low cost of natural gas makes an investment in an electric heat pump less economical in the long term, and therefore less likely.

Previous attempts to enhance efficiency of a heating system include direct expansion systems in which an evaporator of a heat pump is directly attached to the back of a photovoltaic (PV) panel. A direct expansion system involves running long refrigerant lines from PV panels to a module inside of a structure. Accordingly, a direct expansion system is difficult and expensive to install, and presents an environmental risk of refrigerant leakage. Solar air heating systems are similar, but involve heating an enclosed air space around an evaporator portion of a refrigerant line for a heat pump.

TECHNICAL FIELD

Embodiments of the present disclosure relate to a system and process for solar assisted water heating. In more detail, embodiments relate to a solar thermal assisted heating system and process using a thermal collector coupled to a photovoltaic panel to provide heated fluid to a heat pump that transfers heat from the heated water to a hot water storage tank.

BRIEF SUMMARY

In an embodiment, a photovoltaic thermal system heats water that is circulated through a heat exchanger where the opposing side acts as the evaporator for a heat pump. The condenser side of the heat pump provides heat to a hot water storage tank. In such an embodiment, the heat pump may be integrated with the storage tank in a single enclosure.

In another embodiment, an enclosure includes two pumps, two heat exchangers, a water-to-water heat pump, and a control system. The pumps are respectively coupled to a thermal photovoltaic system and a hot water storage tank. Such an embodiment may be installed in a structure and coupled to a pre-existing hot water tank or water heating system. At times when the heat pump is not producing energy, the off-the-shelf tank may use an integral heat source to heat water in the tank, where that heat source could be an electric element or gas burner.

An embodiment of a solar thermal assisted water heating system includes a thermal collector comprising a plurality of fluid channels configured to collect heat from a surface of a photovoltaic module, a drain-back tank coupled to the thermal collector, a first pump coupled to the drain-back tank and configured to pump fluid from the drain-back tank to the thermal collector, a first heat exchanger configured to receive fluid from the thermal collector, a heat pump coupled to the first heat exchanger and configured to remove heat from the fluid and to heat water with the removed heat, and a controller configured to control the first pump and the heat pump.

The system may further comprise a second heat exchanger coupled to the heat pump and configured to transfer heat from the heat pump to water, and the drain-back tank, the first pump, the first heat exchanger, the heat pump and the controller may all be disposed in a single enclosure. The system may further include a second pump configured to pump the water from the second heat exchanger to a water storage tank, wherein the second pump is disposed in the single enclosure.

In an embodiment, the system further comprises a hot water storage tank, and the drain-back tank, the first pump, the first heat exchanger, the heat pump, the controller and the hot water storage tank are all disposed in a single enclosure. The system may further include a mixing valve disposed at an outlet of the hot water tank, wherein the system is configured to mix hot water from the hot water tank with tap water to provide water at a predetermined temperature. In an embodiment, the controller and the heat pump are powered by electricity from the photovoltaic module.

The drain-back tank may be insulated to an R-value of at least 4 and configured to store heated fluid when the fluid is not circulating between the thermal collector and the heat pump. The controller may be configured to operate the first pump when the heat pump is not in operation to collect heated fluid in the drain-back tank, and wherein the drain-back tank may be configured as a thermal battery that stores at least 4.5 kWh of energy that can be used to heat water when environmental temperatures decrease. In an embodiment, the controller is configured to operate the first pump and the heat exchanger to remove heat from the heated fluid stored in the drain-back tank after sunset. The controller may be configured to operate the first pump during the daytime when the heat pump is not in operation to collect heated fluid in the drain-back tank, and to operate the first pump and the heat exchanger to remove heat from the heated fluid stored in the drain-back tank after sunset.

In an embodiment, the drain-back tank is an insulated tank that includes a phase change material configured to store heat by transitioning between phases, the phase change material having a phase change transition temperature between 60 and 180° F. The controller may be configured to receive a first temperature signal from a first temperature sensor in a hot water tank, activate the first pump and the heat pump when the temperature signal indicates a temperature below a first threshold value, and deactivate the first heat pump when the temperature signal indicates a temperature above a first threshold value. The controller may be further configured to receive a second temperature signal indicating a temperature of tap water and adjust a mixing valve to mix the tap water with water in the hot water tank to provide water at a predetermined temperature.

In an embodiment, the controller is configured to optimize system efficiency based on historic usage patterns, and configured to communicate with an electrical utility and execute instructions from the electrical utility balance a load on an electric grid.

An embodiment may further comprise a bypass valve configured to prevent fluid pumped by the first pump from flowing through the thermal collector when the bypass valve is active, a first temperature sensor coupled to the thermal collector, and a second temperature sensor coupled to the drain-back tank, wherein the controller is configured to receive a signal from a third temperature sensor coupled to a hot water storage tank.

The controller may be configured to close the bypass valve when a value of a temperature of the first temperature sensor minus a temperature of the second temperature sensor is less than a first threshold value. The controller may be further configured to activate the first pump and the heat pump to transfer heat from fluid stored in the drain-back tank to the hot water storage tank while the bypass valve is activated. The controller may be configured to open the bypass valve when the temperature of the first temperature sensor minus the temperature of the second temperature sensor is greater than a second threshold value, and the temperature of the first temperatures sensor is more than a third threshold value. The controller may be configured to activate a backup heat supply to provide hot water to the hot water tank when a temperature of the second temperature sensor is less than a threshold value. In an embodiment, the controller is further configured to activate the backup heat supply when the controller determines that an efficiency of the heat pump falls below a threshold value.

In another embodiment, a system includes a thermal collector configured to collect heat from the environment and provide the heat to a fluid within the thermal collector, a drain-back tank coupled to the thermal collector, a first pump coupled to the drain-back tank and configured to pump the fluid from the drain-back tank to the thermal collector, a first heat exchanger configured to receive the fluid from the thermal collector, a heat pump coupled to the first heat exchanger and configured to remove heat from the fluid and to heat water with the removed heat, and a controller configured to control the first pump and the heat pump.

The system may include a second heat exchanger coupled to the heat pump and configured to transfer heat from the heat pump to water, wherein the drain-back tank, the first pump, the first heat exchanger, the heat pump and the controller are all disposed in a single enclosure. The system may include a second pump configured to pump the water from the second heat exchanger to a water storage tank, and the second pump may be disposed in the single enclosure.

In an embodiment, the drain-back tank is insulated to an R-value of at least 12 and configured to store heated fluid when the fluid is not circulating between the thermal collector and the heat pump, the controller is configured to operate the first pump when the heat pump is not in operation to collect heated fluid in the drain-back tank, and the drain-back tank is configured as a thermal battery that stores heated fluid when the environment has a first temperature, and the controller is configured to provide the heated fluid stored in the drain-back tank when the environment has a second temperature that is below the first temperature. The controller may be configured to receive a first temperature signal from a first temperature sensor in a hot water tank, activate the first pump and the heat pump when the temperature signal indicates a temperature below a first threshold value, and deactivate the first heat pump when the temperature signal indicates a temperature above a first threshold value.

The controller may include a non-transitory computer readable medium with computer-executable instructions stored thereon which, when executed by a processor, perform steps associated with embodiments of the present disclosure. The processor may be included in the controller.

BRIEF DESCRIPTION OF THE DRAWINGS

FIG. 7 illustrates an embodiment of a thermal solar-assisted water heating system in which a hot water tank is integrated with a heat pump in a single enclosure.

DETAILED DESCRIPTION

A detailed description of embodiments is provided below along with accompanying figures. The scope of this disclosure is limited only by the claims and encompasses numerous alternatives, modifications and equivalents. Although process steps are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding. These details are provided for the purpose of example and embodiments may be practiced according to the claims without some or all of these specific details. For the sake of clarity, technical material that is known in the technical fields related to this disclosure has not been described in detail so that the disclosure is not unnecessarily obscured.

Figure 1:
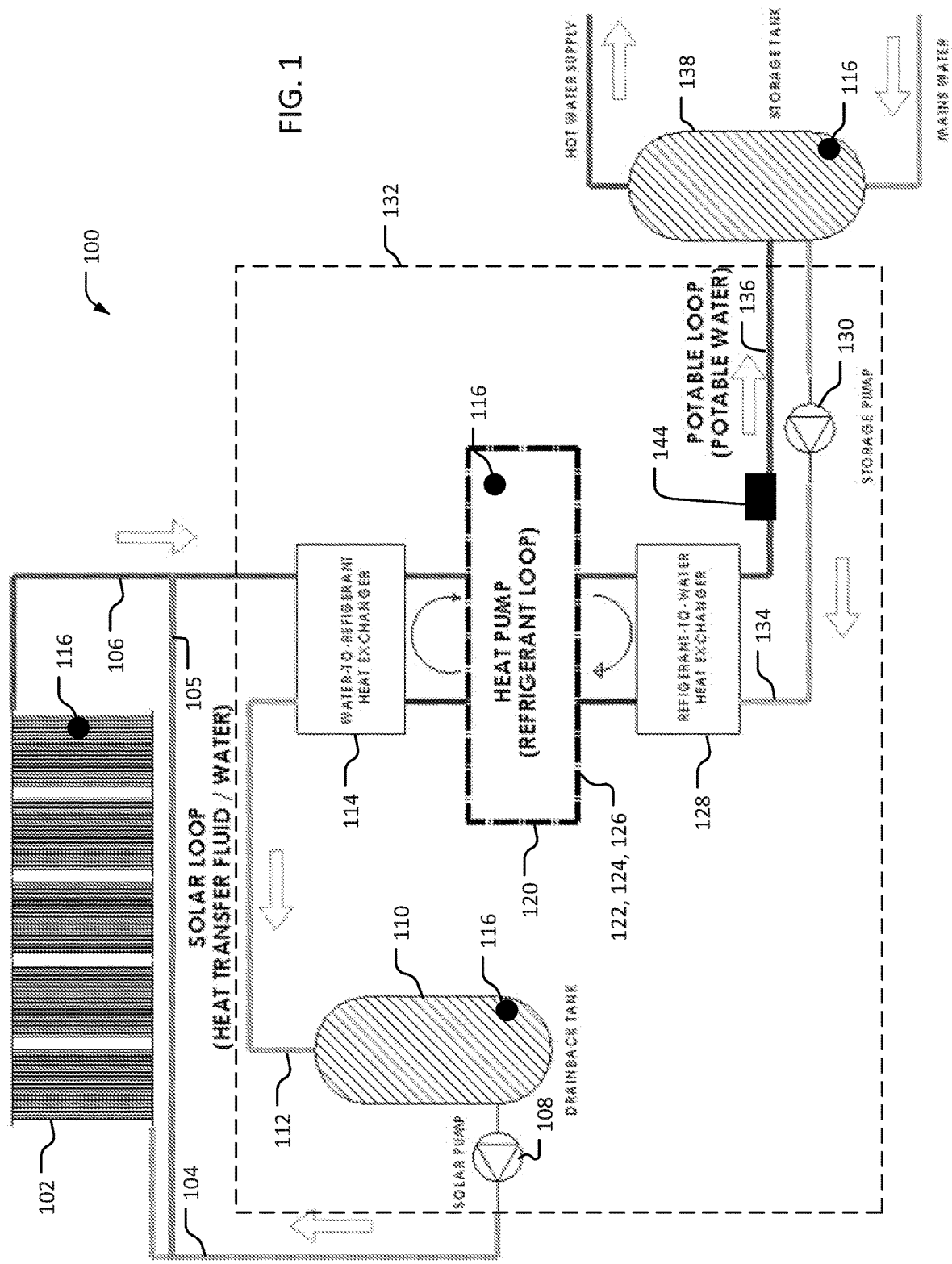
FIG. 1 illustrates an embodiment of a thermal solar-assisted water heating system.

FIG. 1 illustrates one specific embodiment of a thermal solar-assisted water heating system 100. The embodiment illustrated in FIG. 1 has multiple components that are provided in a single enclosure 132 that is separate from a hot water storage tank 138. Accordingly, the system 100 shown in FIG. 1 can be installed for use with an existing hot water storage tank 138. For example, system 100 can be retrofit to use an existing hot water storage tank, which may be an electric or gas-powered hot water storage tank 138. In some embodiments, the electricity or gas that is normally used to heat water for the storage tank 138 may be disabled, and all heating for hot water is provided by the system 100. In other embodiments, an electric or gas supply for storage tank 138 may serve as a back-up or supplement to heating provided by the system 100. Additional advantages of using a separate hot water storage tank 138 are ease of replacement and ease of installation in compact spaces.

Water is heated by solar energy at the thermal collector 102. The thermal collector 102 is typically mounted on the exterior of a residential or commercial structure, so it may provide heat to the system 100 from the atmosphere even under cloudy conditions or after sunset. In an embodiment, components of the thermal collector 102 are the same as COOLPV® components that are marketed under that name by FAFCO® Inc. at the time this disclosure is filed.

The thermal collector 102 receives fluid from input line 104 and provides water to a first heat exchanger 114 through output line 106 in a first fluid loop ("Solar Loop"). The input and output lines 104 and 106 may comprise a polymer material such as a cross-linked polyethylene (PEX), polypropylene, a rubber material or polyvinyl chloride (PVC). One or more section of the input and output lines may comprise a metal material such as copper or zinc pipes. The fluid that is heated by the thermal collector 102 is not especially limited, but may comprise water. The water may be plain water, or water that is treated with a material such as chlorine to prevent organic growth, an antifreeze, a lubricant, etc. The first heat exchanger 114 may be a double-wall brazed plate stainless steel heat exchanger, for example. Although FIG. 1 shows first heat exchanger 114 coupled to drain-back tank 110 by a fluid line 112, in an embodiment, fluid line 112 is not present and the first heat exchanger 114 is in direct contact with fluid stored in the drain-back tank.

Input line 104 is coupled to a solar pump 108 which is configured to flow fluid from the drain-back tank 110 to thermal collector 102. The solar pump 108 may be a variable speed pump that is controlled by controller 126 to operate at high speed when filling the system with fluid, and at lower speeds when moving heated fluid through the system to conserve energy. Solar pump 108 may be disposed below the lowest fluid level of drain-back tank 110 to provide self-priming. In various embodiments, solar pump 108 may be integrated with or provided separately from the drain-back tank 110.

The system 100 may further comprise a bypass valve 105 coupled to a fluid path from solar pump 108. The bypass valve 105 may be activated to bypass the thermal collector 102, so that fluid is pumped from drain-back tank 110 and across heat exchanger 114 without passing through the thermal collector 102. The bypass valve 105 may be activated to bypass the thermal collector 102 when a signal from a temperature sensor 116 in the thermal collector 102 falls below a threshold level, and/or when a differential temperature from a temperature sensor in the drain-back tank 110 and the thermal collector falls below a threshold. In an embodiment, a controller 126 is configured to open the bypass valve 105 when the temperature of fluid in the thermal collector 102 is about 10° F. or 4° C. above the temperature of fluid in the drain-back tank 110, and to close the bypass valve when the temperature of fluid in the thermal collector is about 5° F. or 2° C. above the temperature of fluid in the drain-back tank. Using different temperatures for open and closing the valve can avoid rapid cycling of the bypass valve 105.

The pump 108 may receive electric power from photovoltaic (PV) panels of a photovoltaic thermal (PVT) system, a power outlet, or a dedicated PV and battery system. In an embodiment, electrical components of systems of the present disclosure may be powered directly by solar power from a PV panel coupled to thermal collector 102, or indirectly by solar power that is collected by a PV panel and stored in a battery. In such an embodiment, each of the electrical components may operate using DC power to reduce losses associated with conversions between AC and DC.

The thermal collector 102 may comprise a plurality of polymeric tubes that are coupled between two manifolds, as described by U.S. Pat. No. 10,381,500. An embodiment of a thermal collector 102 is illustrated in FIG. 2.

Figure 2:
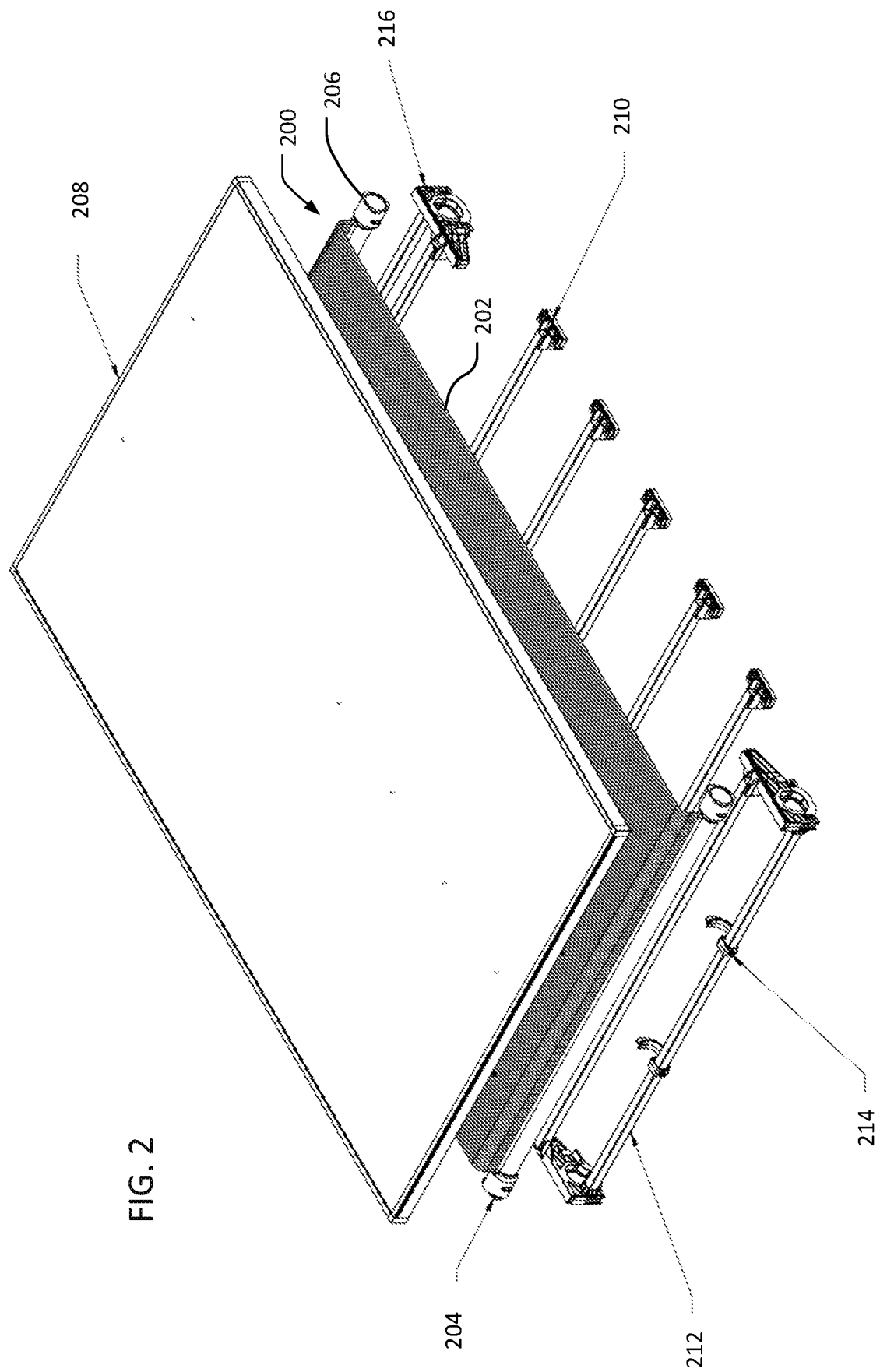
FIG. 2 is an exploded view of an embodiment of a thermal collector and photovoltaic panel.

As seen in FIG. 2, a thermal collector 102 may include a PV heat exchanger 200 comprising a plurality of polymer tubes 202 arranged in parallel to one another, and coupled between a first manifold 204 and a second manifold 206. The thermal collector 102 is coupled to a PV panel 208 and configured to receive heat from the PV panel 208, and transfer the heat to a fluid flowing through the polymer heat exchanger 202.

The PV heat exchanger 200 may include an outdoor grade polymer tube sheet of polymeric tubes 202 that fills the area behind the photovoltaic module cells enabling effective and uniform cooling of all the photovoltaic cells. A tube sheet may include a plurality of polymeric tubes 202 that are mechanically coupled to one another, for example by melt or adhesive bonding polymer tubes. In an embodiment, the tubes are co-extruded so that they are bonded in a single tube sheet when the tubes are manufactured.

The tubes are coupled to a first manifold 204 disposed on a first side of the tubes 202, and a second manifold 206 disposed on a second, opposite side of the tubes. One of the manifolds 204 and 206 collect a heat exchange fluid and provide the heat exchange fluid to the tubes, while the other manifold receives the fluid from the tubes and provides the fluid to heat exchanger 114. Although the tubes 202 may comprise a polymeric material, they are not limited to only polymeric materials—for example, the tubes may comprise a polymeric material that is reinforced by an inorganic material such as metal or glass.

In an embodiment, the manifolds have connections enabling them to be plumbed together to enable parallel fluid flow through rows of panels underneath photovoltaic modules. Polymer connections enable simple plumbing, repair, and replacement by leveraging modern PEX type fittings (push, crimp, flare, etc.), barb/hose/clamp connections (typical of solar pool collectors), gasket and O-ring fittings, and fusion welded connections. The manufacturing process of the polymer heat exchanger allows it to be easily configured for various photovoltaic module sizes. The PV heat exchanger 200 has advantages of being cost effective with large heat transfer area, ease of manufacturing in different sizes, lightweight, tolerant of freezing conditions, resistant to water sanitizers and other chemicals; resistant to limescale buildup and heat exchanger fouling; resistant to corrosion; easily transported, and resistant to ultraviolet radiation.

The heat transfer performance is not limited by the low thermal conductivity of polymer materials used for the tubes 202 due to the relatively low available solar flux and large surface area of the polymer heat exchanger. The assembly's lightweight enables mounting to roofs which are weight limited.

In an embodiment, a tube sheet of polymeric tubes 202 comprises 100 to 300 tubes in parallel in a solid sheet. The tubes may have inner diameters of 1/8" to 3/8", and the tube sheet may have overall sheet dimensions that nearly match the inner dimensions of a framed PV modules (39+/−3"×66"+/−3" for 60 cell modules, 39+/−3"×78"+/−3" for 72 cell modules, 42+/−3"×62"+/−3" for 96 cell modules, and 39+/−3"×81"+/−3" for 128 cell modules). The manifolds 204 and 206 may include manifold pipes with diameters of 1/2" to 2" which have connections at each end which facilitate coupling multiple heat exchangers 200 together. Accordingly, multiple thermal collectors 102 may be coupled in series in some embodiments with minimal plumbing. In another embodiment, multiple thermal collectors 102 are coupled in parallel to a separate manifold that collects fluid from the multiple collectors and provides that water to the heat exchanger 114.

In an embodiment, the manifold pipes 204 and 206 are situated such that they are disposed below the tubes 202. The tubes may extend near the inner corners of the PV module 208 where it has a slight radius, and PV module wires may extend from a junction box on the PV module through openings between the tubes 202. The tubes 202 may be pressed against the back of the PV module 208 around the perimeter of the junction box as well as behind the junction box. A portion of tubes 202 may be removed or pushed aside for junction box access.

As seen in FIG. 2, the tubes 202 may be physically oriented so that they rest against a back surface of the PV module 208 in a default configuration. For example, when the manifolds 206 are oriented so that the tubes 202 extend from the manifolds in a first direction and the PV module 208 is located in the first direction, the tubes will naturally come into contact with the PV module.

In some embodiments, contact between the tubes 202 and the PV module 208 is further facilitated by mechanical components, so that the polymer tubes can remain in contact with the PV module even when the tubes expand and contract due to fluid pressure and varying thermal conditions. For example, as seen in FIG. 2, tubes may be held in contact with the back of PV module 208 by a set of rails 210. The rails 210 may be mechanically coupled to the PV module by a mechanical fastener or an adhesive. In another embodiment, rails 210 are coupled to side rails (not shown) that run in parallel to an edge of the PV module and perpendicular to the other rails. In still another embodiment, a solid backsheet is arranged to maintain contact between the tubes 202 and PV module 208. The solid backsheet may be curved so that it uses spring force to retain the tubes against a module. In one embodiment, the backsheet is a corrugated material such as a corrugated polymer sheet.

A tube sheet and manifold pipe configuration of a PV heat exchanger 200 enables it to take high pressure by resolving pressure through hoop stress. A parallel tube configuration of the PV heat exchanger 200 enables fluid to be circulated at a high flow rate with little pressure reduction. Circulating the fluid at higher flow rates enables higher efficiencies by maintaining a lower average temperature of the PV module 208, while simultaneously ensuring even flow. A tube sheet with small diameter tubes has small valleys between tubes. The thickness of the tubes is minimized to improve heat transfer, but is sufficient to maintain adequate hoop strength with a safety factor. The tubes 202 may be formed of a thermoplastic polymer such as polyethylene, polypropylene, polydimethylsiloxane, a copolymer such as EPDM, or a more conventional rubber such as polybutadiene. In an embodiment, the polymer is loaded with a filler such as silica or alumina to enhance its thermal conductivity.

In an embodiment, the manifolds are coupled to support spars 212 by spar retainers 214 which retain the manifolds in place with respect to the support spars. Ends of the manifolds 204/206 may be coupled to header supports 216 which are arranged at both ends of a spar 212. Accordingly, the thermal collector 102 may comprise a set of components that hold fluid channels in place with respect to a PV panel 208.

The PV panel 208 may be a conventional PV module that is a typical 60 cell, 72 cell, 96 cell, or 128 cell crystalline silicon framed glass module. The PV solar module glass provides a firm and flat surface for the polymer heat exchanger to press against. The photovoltaic module glass and thin composite of cells, encapsulant, and film sheet are moderately thermally conductive promoting heat transfer. In certain conditions, the PV module glass may act as a conductive path for heat to be uniformly transferred to the heat exchanger, including the area above a junction box where the heat exchanger is not in contact.

In embodiments, the PV module 208 may be modified form an off-the-shelf configuration to accommodate the PV heat exchanger 200, for example by moving the junction box to enable the heat exchanger to be in direct contact of the area above the junction box location. The PV module 208 can also have two layers of glass, or be frameless and/or utilize a non-glass front sheet. In the frameless version, a PV heat exchanger 200 with low thermal expansion may be utilized to enable alternate interface solutions. Where the PV module 208 has two layers of glass, it may omit an opaque backsheet allowing sunlight to shine directly on the PV heat exchanger 200, which can further increase thermal performance. Where the backsheet is opaque, it can be various colors such as black or white. A black backsheet and frame can have increased heat output due to their absorptive dark color.

The PV module 208 can have front or back contact crystalline silicon cells, but also thin film with cells such as cadmium telluride (CdTe), copper indium gallium selenide (CIGS) and amorphous silicon (a-Si). The PV module can also include a microinverter or power optimizer which can be cooled by the PV heat exchanger 200 to increase performance and extend design life. Slots may be cut in the frame of a PV module 208 for manifold 204/206 pipe or connections to fit through. The junction box can be relocated to allow the PV heat exchanger 200 to directly contact the back of the module above the junction box as well as avoid modifications such as slits in a tube sheet to accommodate the junction box and wires.

As described previously, effective heat transfer between the photovoltaic module 208 and polymer heat exchanger 200 is facilitated by direct contact between the back surface of the PV module 208 and a surface of the PV heat exchanger 200. This effective heat transfer is enabled within this embodiment with the back structure that applies constant pressure to the back of the polymer heat exchanger.

This configuration provides a large available heat transfer area of the heat exchanger, a thin wall tube sheet with commodity polymers (polyethylene or polypropylene), uniform flow of the polymer heat exchanger, complete coverage behind PV cells and slight thermal conductance of the composite. Testing has shown the heat output of such an assembly to be comparable to the highly efficient output of unglazed solar pool heating collectors.

In an example, the polymer tubes 202 and manifolds 204 and 206 are configured as a polymer heat exchanger 200 that is 39+/−3" wide×66"+/−3" long for a 60 crystalline silicon cell photovoltaic module or 39+/−3" wide×78"+/−3" long for a 72 crystalline silicon cell photovoltaic module or 42+/−3" wide×62"+/−3" long for a 96 crystalline silicon cell photovoltaic module, or 39+/−3" wide×81"+/−3" long for a 128 crystalline silicon cell photovoltaic module. Accordingly, the PV heat exchanger may be sized to accommodate various configurations of PV panel 208.

Embodiments of a fluid cooled PV module assembly achieve high thermal transfer without significantly raising the PV module stagnation temperature. Other conventional embodiments try to achieve intimate thermal heat transfer by insulating the back of a module to effectively create an oven. This kind of approach is heavy, takes up space, is costly, and can substantially lower the PVT system performance. Without fluid-cooling, these kinds of PVT designs may raise the stagnation temperatures as much as 30 degrees, which can substantially degrade system performance.

Figure 3:
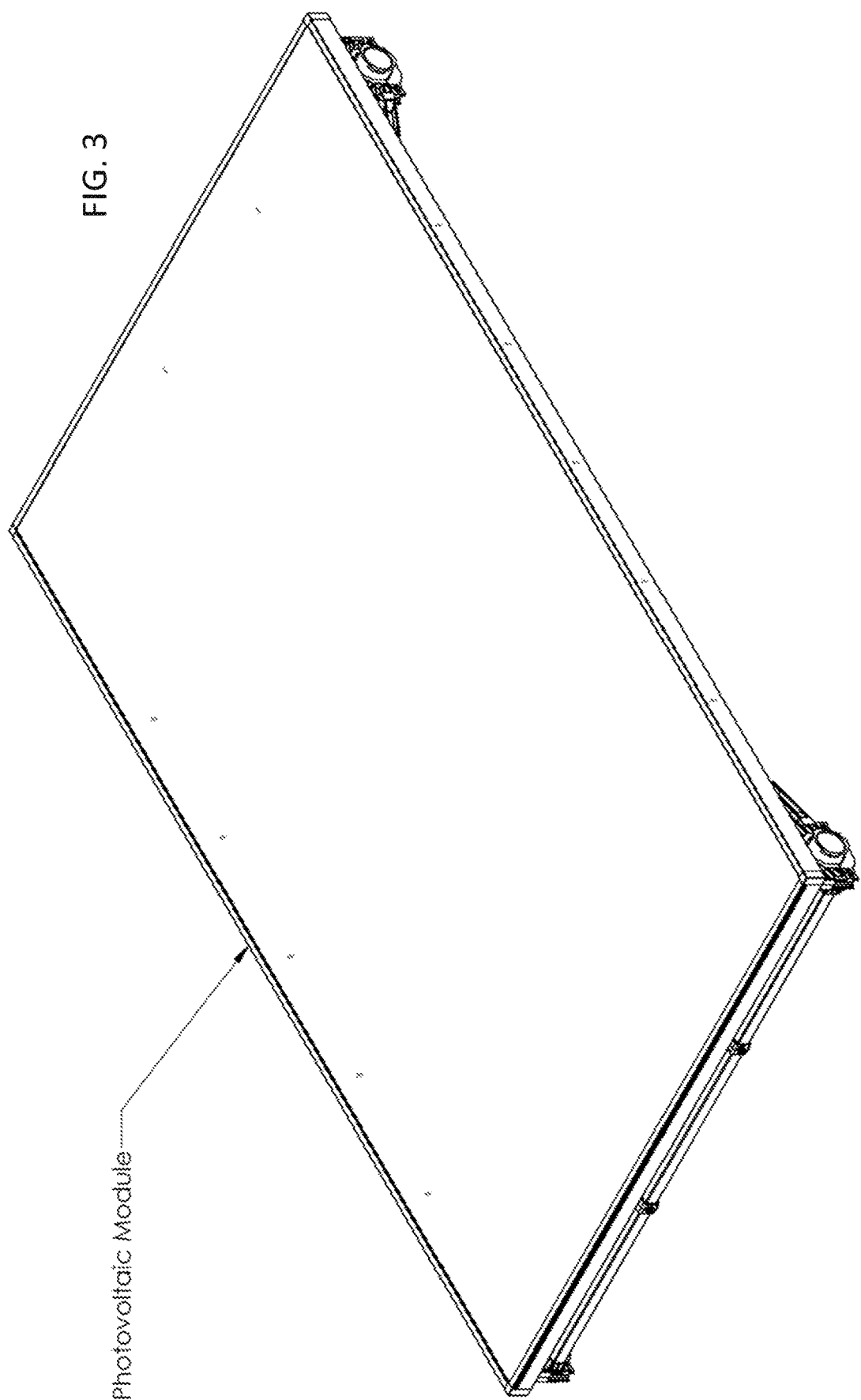
FIG. 3 illustrates an embodiment of a thermal collector and photovoltaic panel.
Figure 4:
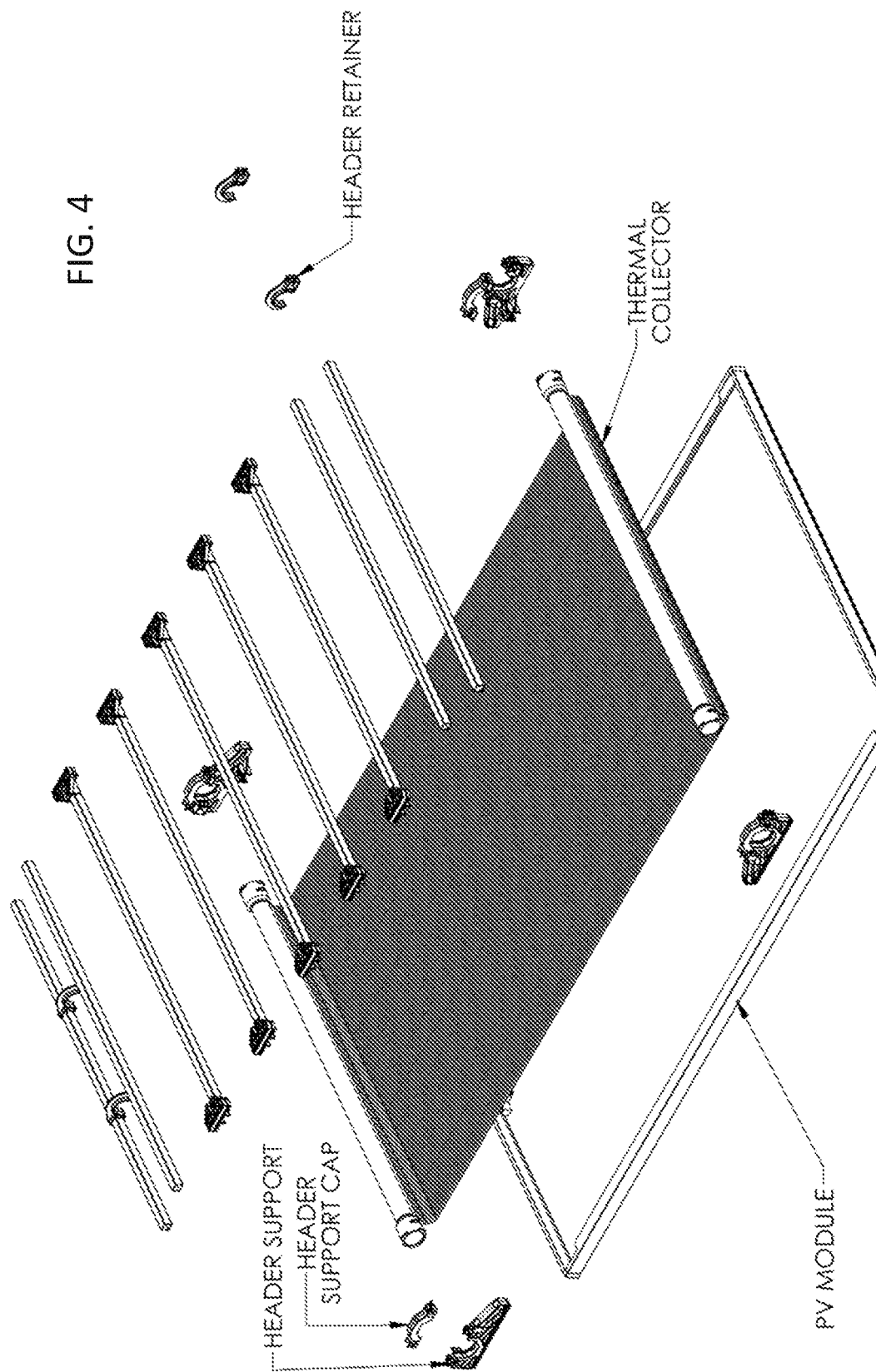
FIG. 4 is an exploded view of an embodiment of a thermal collector and photovoltaic panel.

FIG. 3 shows an overhead view of an assembly of a PV module and a thermal collector, and FIG. 4 illustrates another exploded view of an embodiment of a thermal collector and PV module from the opposite side shown in FIG. 2. Here, we see additional details for the header and manifold components, which can include a header support cap and a header support. In an embodiment, the manifold support includes a manifold mount and a manifold cap. The manifold mounts can be coupled to the first frame side and second frame side of the PV frame as described previously. The manifold caps can be coupled to the manifold mounts such that the first and second ends of the manifolds of the thermal collector module are attached to the PV frame.

Figure 5:
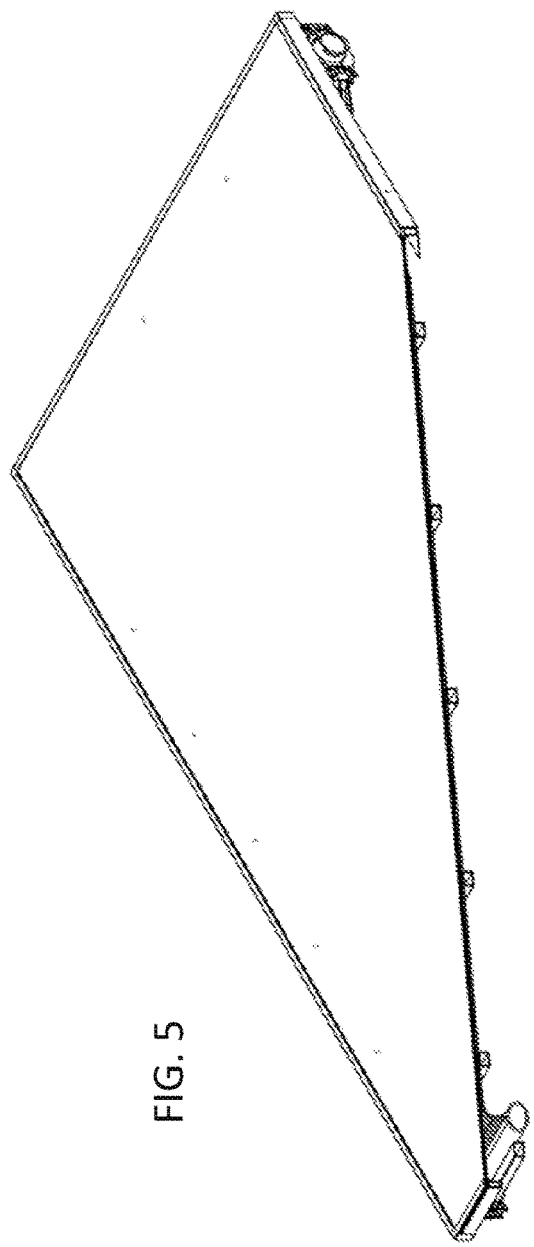
FIG. 5 is a cross-sectional view of an embodiment of a thermal collector and photovoltaic panel.
Figure 6:
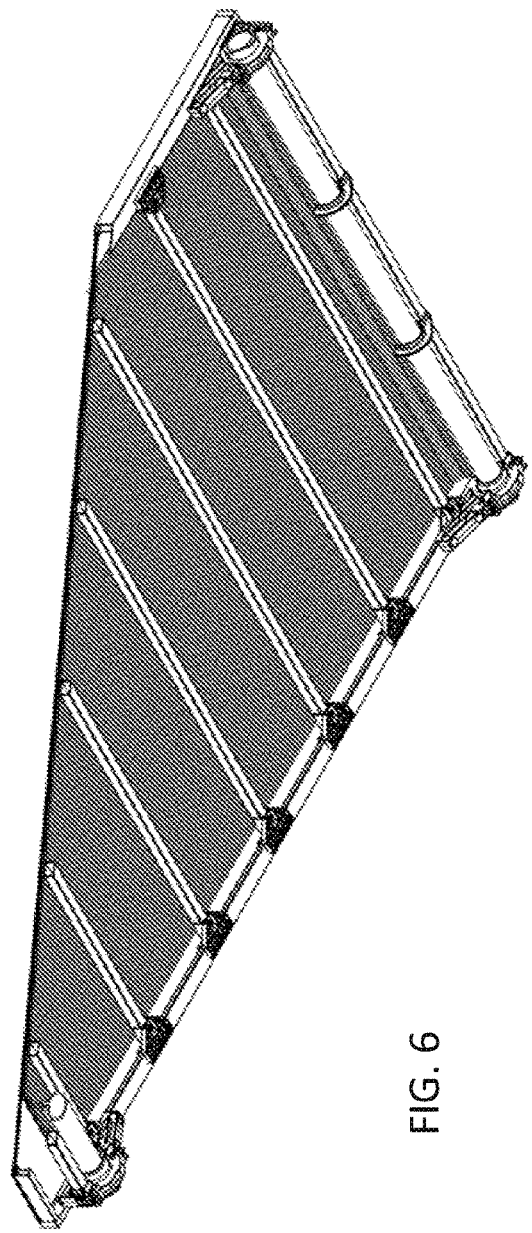
FIG. 6 is a cross-sectional view of an embodiment of a thermal collector and photovoltaic panel.

Cross sections of this assembly are shown in FIG. 5 and FIG. 6. FIG. 5 shows a cross-sectional perspective view from the PV module side of an assembly, while FIG. 6 shows a cross-sectional perspective view from the back structure side. FIG. 6 shows a plurality of support spars evenly distributed across the back region of a PV module. In a specific embodiment, the tubes 202 of a PV heat exchanger 200 are bent at about 90 degrees at the first end and the second end to substantially maintain longitudinal alignment of the thermal collector module. This 90-degree bend can be seen near the cross section of the manifold, which is at the narrow end of the assembly cross section.

In addition to the benefits of the intimate contact between the PV module and the PV heat exchanger, the 90-degree bend of the polymer tube sheet also provides many benefits. These benefits include facilitating the flowing of a heat exchange fluid in and out of the respective headers/manifolds without modifying the frame of the PV module. This construction also allows header-to-frame attachment such that the tube sheet bend accommodates material displaced by heating through the CTE (Coefficient of Thermal Expansion) or reduces the effects of CTE. This effect assists in maintaining longitudinal alignment of the headers/manifolds.

The thermal collector 102 may collect heat even when a PV module coupled to the thermal collector is not receiving solar energy by receiving heat from the atmosphere. Accordingly, the thermal collector 102 may collect heat on cloudy days or after the sun has set.

Returning to the system illustrated in FIG. 1, the thermal collector 102 provides fluid to a first heat exchanger 114 through output line 106. Heat is transferred to heat pump 120 by the first heat exchanger 114, and the cooled fluid is provided to drain-back tank 110 to complete a cycle. The drain-back tank 110 may store fluid in the thermal collector/first heat exchanger loop when the heat pump is not operating. The drain-back tank 110 may be used for long term storage, e.g. for storing fluid during winter. The heat pump 120 may be charged with a suitable refrigerant such as R 134A, for example.

The drain-back tank 110 may store a substantial amount of fluid—for example, the drain-back tank 110 may have a storage capacity of 20, 25, or 30 gallons of more. Accordingly, the drain-back tank 110 may store fluid that is heated during the daytime, and continue to extract heat from the fluid long after sunset. Similarly, the drain-back tank can store fluid that is heated to relatively high temperatures by direct solar radiation to a PV panel when the sun is shining and continue to provide that heated water when the PV panels are shielded from direct solar radiation, e.g. by periods of cloudiness or a shadow moving across the PV panels. In such scenarios, the drain-back tank 110 may provide consistent heat output through uneven periods of solar radiation.

More generally, the drain-back tank 110 may store water that is heated when environmental temperatures are higher, and provide that stored energy to the primary storage tank 138 through the heat pump 120 when environmental temperatures are lower. In a specific embodiment, the controller 126 may be configured to operate the solar pump to collect heated water in the drain-back tank 110 when environmental temperatures are above a threshold value, and to stop pumping water when environmental temperatures are below the threshold value. The threshold value may be variable, and may be set, for example, based on weather forecast information, so that heated fluid is provided to the drain-back tank 110 when environmental temperatures are high, and the stored fluid is used to heat water when environmental temperatures are low.

In an embodiment, the drain-back tank 110 may include a second heat storage medium in addition to the fluid running through the thermal collector 102. For example, the drain-back tank 110 may include a phase-change material (PCM) that stores energy by undergoing a phase change from a solid state to a liquid state. Energy stored in the drain-back tank 110 by heated fluid or a PCM may allow the drain-back tank to effectively perform as an energy storage system or thermal battery, allowing the system 100 to operate efficiently well past sunset.

The drain-back tank is insulated so that it can store heated water for extended periods of time while minimizing heat loss. For example, the drain-back tank may have an R-value of 12, 16, 20, 24, or 30 or more. Since hot water is typically used at uneven intervals, the heat exchanger 120 may not operate for substantial periods of time when hot water storage tank 138 is full of water that is over a set temperature. The thermal collector fluid loop may continue to operate during such times, and fluid heated by the thermal collector 102 may be stored in the drain-back tank 110 and provided to the heat pump 120 when the water in the storage tank falls below the set temperature.

In an embodiment, the drain-back tank 110 stores fluid that is heated during the day when electric rates are high in certain regions, so that heat can be transferred from the heated fluid to the heat pump during off-peak or cooler hours. Such operations can reduce costs to a user, and even out energy usage on an electrical grid. In this way, the drain-back tank 110 functions as a thermal battery storing about 5 kWh of energy in a 25-gallon tank that can be used to recharge the storage tank 138 as appropriate. In an embodiment, system 100 may be operated in conjunction with signals received from a utility provider to level an electrical load on a local power distribution system. In an embodiment, the temperature of water stored in the drain-back tank 110 may be 150° F. or greater.

Heat pump 120 may comprise a compressor 122, an expansion valve 124 and a controller 126. The controller may include a processor and a non-volatile memory with instructions stored thereon which, when executed by the processor, control operations of the system 100. In some embodiments, controller 126 may be in a different physical location from components of the heat pump, and may control the heat pump components by sending electrical signals through wired or wireless connections to the heat pump components.

The controller 126 may be coupled to multiple sensors such as temperature sensors 116 disposed in different parts of a system. For example, a temperature sensor 116 may be disposed in the drain-back tank 110 to monitor temperature of fluid stored in the tank. Additional temperature sensors may be disposed in the storage tank 138, the thermal collector 102, and various additional locations throughout the system. In addition, the controller may be coupled to the solar pump 108, the storage pump 130, compressor 122, expansion valve 124, any additional electrical equipment within the system to control their operation, and to a utility system to perform electrical load balancing. For example, the controller 126 may be networked to the internet and communicate with the electric utility via CTA2045 communication standard or a similar technology. In such an embodiment, the system would be capable of being controlled by the utility in order to load-shift and accommodate the needs of the public electric grid.

The heat pump 120 is coupled to a second heat exchanger 128, and configured to provide heat received from the first heat exchanger 114 through the second heat exchanger 128 to the storage tank 138 by operating the expansion valve 124 and compressor 122. The heated water may circulate between the storage tank 138 and the second heat exchanger 128 through a second fluid loop ("Potable Loop") illustrated in FIG. 1. The second heat exchanger 136 may be in fluid communication with storage tank by a storage supply line 136 and a storage return line 134. A storage pump 130 may be coupled to storage return line 134, and drive water through the potable water loop.

In an embodiment, solar pump 108, storage pump 130, first and second heat exchangers 114 and 128 and drain-back tank 110 are all provided within a single enclosure 132. In such an embodiment, the enclosure can be installed in a structure that already has a hot water storage tank 138 and/or a thermal collector 102, so the enclosure can be retrofit with a thermal solar-assisted water heating system 100. The use of a pre-existing storage tank 138 and/or thermal collector 102 may reduce the waste and cost associated with purchasing and installing a heating system 100. In such a system, piping for one or more of lines 104, 106, 134 and 136 may be integrated with pre-existing plumbing in a structure.

There are numerous advantages associated with consolidating components within a single enclosure. For example, locating noisy equipment such as pumps and a condenser inside the enclosure can lead to much quieter operation. The space occupied by a single enclosure is generally smaller than the space occupied by individual components, and components are protected from damage. Assembly and installation of a single enclosure is much simpler, including plumbing, wiring and mounting. The single enclosure may be insulated so that heat generated by electrical components within the enclosure may be retained and ultimately used to heat water. Insulation of the enclosure may perform multiple roles of sound deadening and retaining thermal energy. Persons of skill in the art will recognize additional advantages beyond those listed here.

FIG. 7 shows another embodiment of a thermal solar-assisted water heating system 700. One difference between the system 700 shown in FIG. 7 and the system 100 shown in FIG. 1 is that the hot water storage tank 138 is stored within the same enclosure as the heat pump 120, heat exchanger 114, drain-back tank 110 and solar pump 108. Accordingly, the system shown in FIG. 7 may be installed in a new structure, may replace a pre-existing water heating system, or may supplement a pre-existing water heating system. In an embodiment, hot water storage tank 138 includes an electric resistive heater or gas burner that may be used when the heat pump 120 is not in operation, or to supplement the heat pump when demand for heated water exceeds the heat pump's ability to supply heat.

Another difference between the system 700 and the system 100 is that the hot water storage tank 138 is directly coupled to coils of the heat pump. In system 700, coils 140 of the heat pump carrying a heated refrigerant are thermally coupled to storage tank 138 so that they transfer heat stored by the heated refrigerant to water stored in the storage tank. In an embodiment, the coils 140 are submerged in the water. In another embodiment, the coils 140 are wrapped around a conductive tank material, e.g. a metal material, and transfer heat through the conductive tank material to the water. In either case, the tank itself may be insulated to an R-value of 12, 16, 20, 24 or 30 or more.

The tank 138 may safely allow the partial storage of water that is substantially hotter than 120° F. so that a small tank can supply a larger load. In such an embodiment, a mixing valve 142 may be coupled to a hot water supply line from the tank 138 to mix room-temperature water, e.g. tap water, with heated water from the storage tank to provide water at a temperature of 120° F., or a predetermined temperature that is lower than the temperature of the stored water. The mixing may be controlled by controller 126, or a mechanical apparatus. In an embodiment, the system includes temperature sensors 116 to sense one or more of temperature of the water that is stored in the tank, temperature of tap water, and temperature of mixed water, to ensure that water provided by the system is at a predetermined temperature.

In such an embodiment, the solar heating phase of the system may be exploited more fully than it otherwise would be if the water in the tank is only heated to a lower temperature, e.g. 120° F. In particular, water in the tank may be heated to a relatively high temperature of 140° F., 160° F. 180° F. or 200° F. or more by continuing to operate the heat pump and PVT solar system during daylight hours. Such operations result in water that is generally considered to be unsafe due to the risk of burns and thermal limits of plumbing. Mixing such water with tap water may ensure that the water provided by the system is at safe temperatures, while limiting the amount of heated water used, and prolonging the amount of time during which water above 120° F. is available. Accordingly, the presence of a mixing valve 142 in the system provides substantial benefits compared to conventional hot water systems.

System 700 has several advantages that could improve efficiency compared to system 100. For example, system 700 may eliminate the second heat exchanger 128 along with any inefficiencies associated with the second heat exchanger. Plumbing between the enclosure and the water tank which exposes a relatively large surface area of water to pipes that may be uninsulated is not present in system 700, thereby eliminating a substantial source of potential heat loss, especially since plumbing in pre-existing structures may not be insulated or may be poorly insulated. Another difference is the absence of storage pump 130, and the energy demands associated with operating a second pump.

An embodiment of the present disclosure uses a PVT array to heat water that is circulated through a heat exchanger where the opposing side acts as the evaporator for a heat pump. The condenser of the heat pump heats the water inside the water storage tank. In an embodiment, a PVT array supplies heated water directly to a heat pump. The heat pump transfers heat from the water heated by the PVT array to an insulated storage tank, and water from the insulated storage tank is used to supply hot water to a residence or structure. A drain-back tank may store fluid for the PVT array, or a portion of the system associated with the PVT array, when the heat pump is not in operation. In some embodiments, the drain-back tank is integrated with the heat pump as a single unit that is readily installed along with an existing or separately supplied water storage tank.

In some embodiments, the system may be supplemented with additional elements that provide heat to the system. For example, resistive heating elements may be provided to the heat exchanger or to the hot water storage tank to supply heat when the environment is cold. In addition, the fluid circulated by PVT the system may be supplemented with an agent that lowers the freezing point so that the system can continue to operate when atmospheric temperatures fall below freezing. In some embodiments, the water may be pumped into the drain-back tank when temperatures fall below a predetermined level.

An embodiment may include a controller configured to anticipate hot water use based on past usage patterns or other data and increases temperature to store more energy in the same tank to avoid running out of hot water based on the anticipated use. The system may utilize a control algorithm to optimize system efficiency and performance based on historic usage patterns. In one configuration the controller would limit the maximum hot water storage temperature to minimize system operation and standby losses due to environmental heat loss. In another configuration the controller may optimize the hours of operation of the heat pump for certain hours of the day to avoid excessive energy costs. In an embodiment, a novel tank design may provide an integral heat transfer at a lower cost than wrapping copper tubing around the outside or inside of the tank. The condenser supplying heat to the tank might do so with a so-called solar wand, or similar product. Similarly, a system pump may be a piston-type that is capable of larger temperature "lifts" than screw or scroll pumps.

Figure 8B:
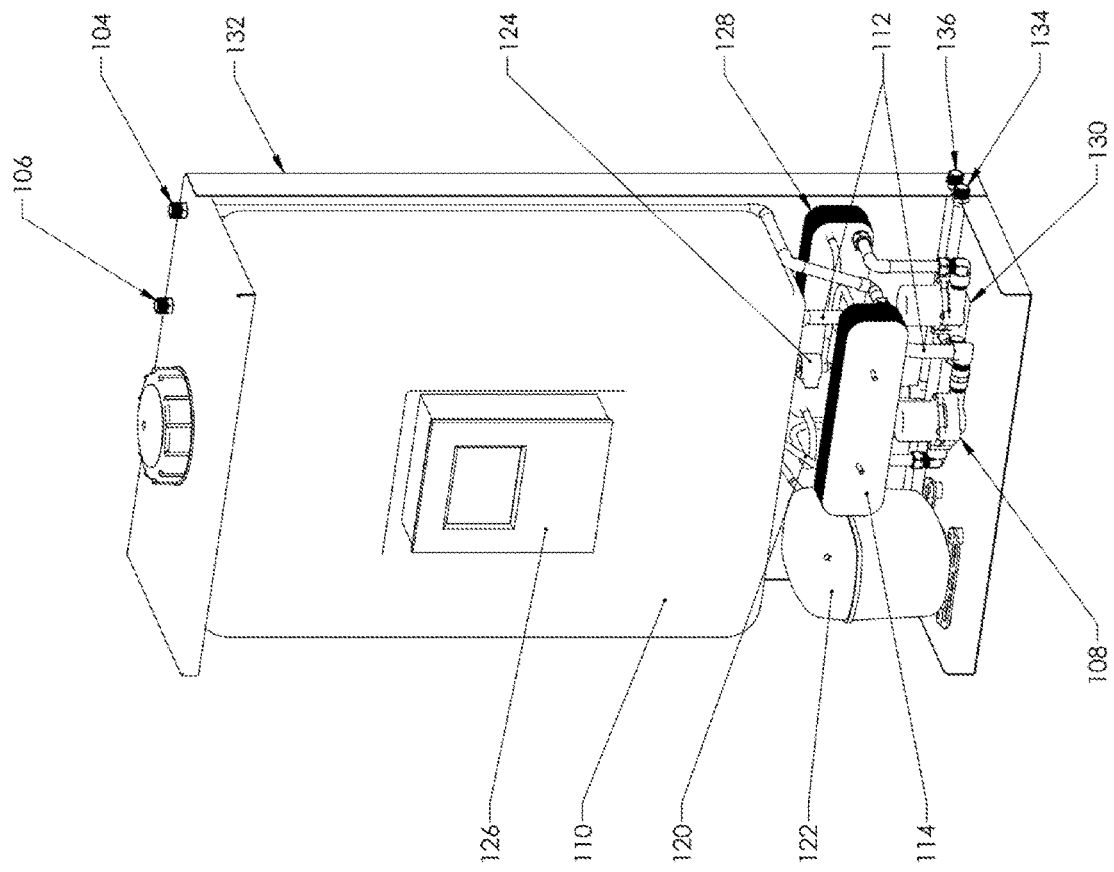
FIG. 8B shows an embodiment of components of a thermal-assisted heating system within the enclosure.
Figure 8A:
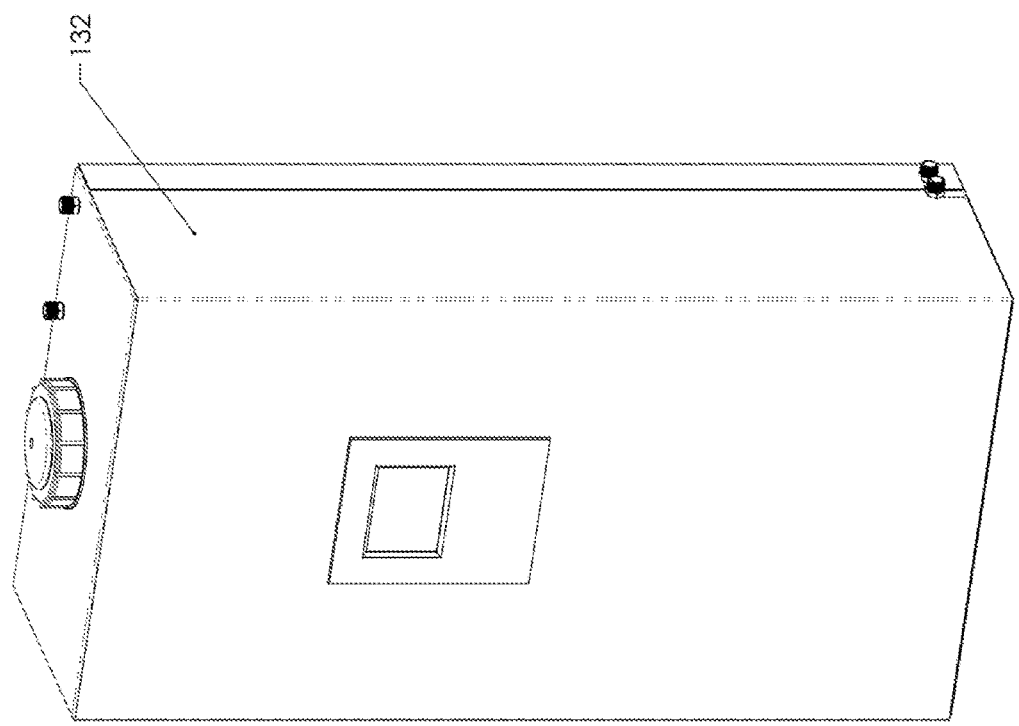
FIG. 8A illustrates an embodiment of an enclosure.
Figure 9:
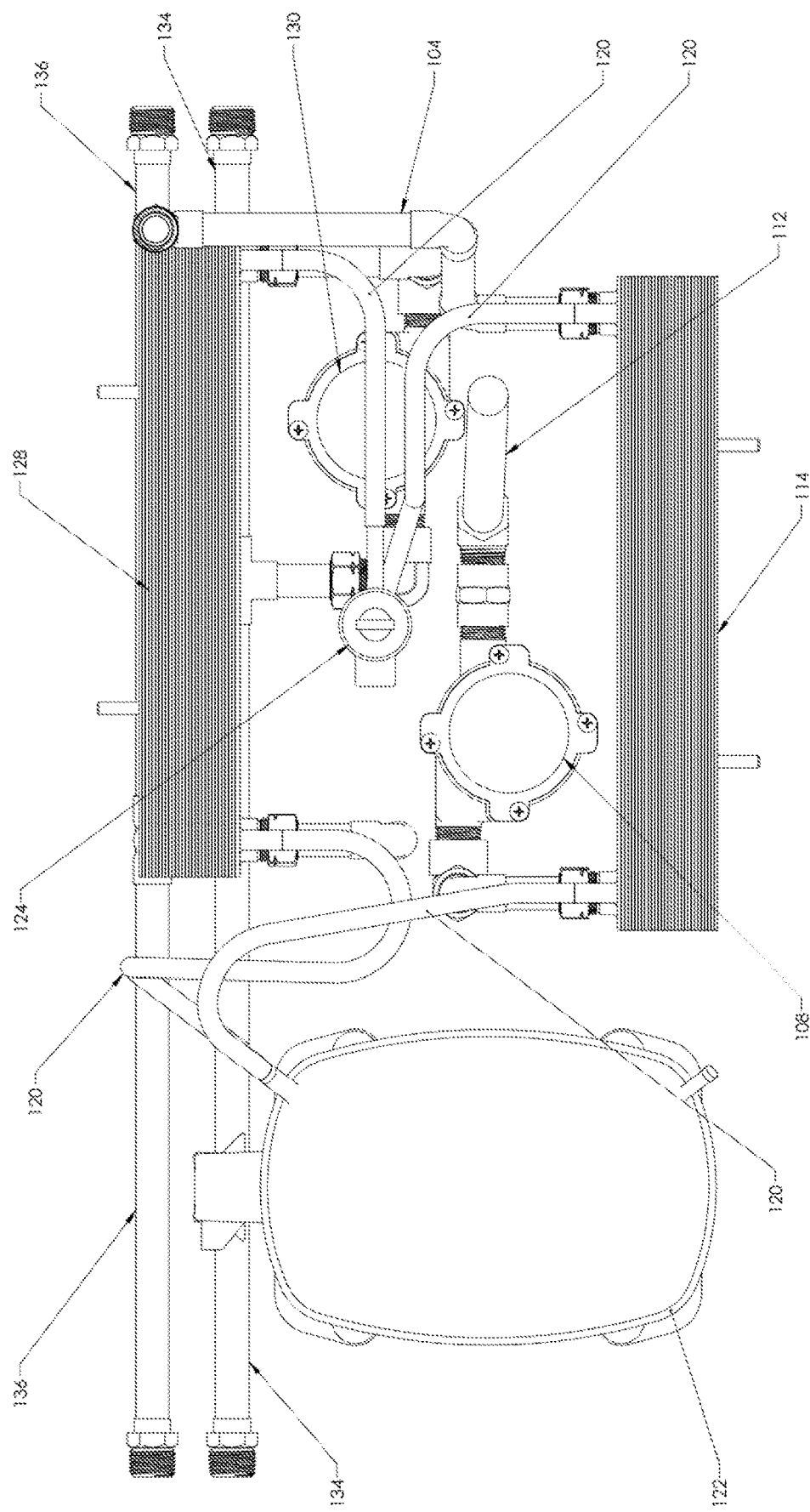
FIG. 9 is a top view of components shown in FIG. 8B.

FIG. 8A illustrates an embodiment of an enclosure 132, FIG. 8B shows an embodiment of components of a solar thermal-assisted heating system within the enclosure, and FIG. 9 is a top view of some of those components. The embodiment shown in FIGS. 8A and 8B are similar to system 100, in which a drain-back tank 110, controller 126, heat pump 120 including compressor 122 and expansion valve 124, solar pump 108, first and second heat exchangers 114 and 128, and associated plumbing are all located within the same enclosure 132. As seen in the figures, most of the components are located below the drain-back tank 110, so heat generated by the components may transfer to the drain-back tank by convective transfer, as well as conductive and radiative transfer due to their close proximity within the same enclosure. Connection points to the input and output lines 104 and 106 to the thermal collector 102 are on the top of the enclosure, along with a lid that can be removed to add fluid to the drain-back tank 110.

Figure 10:
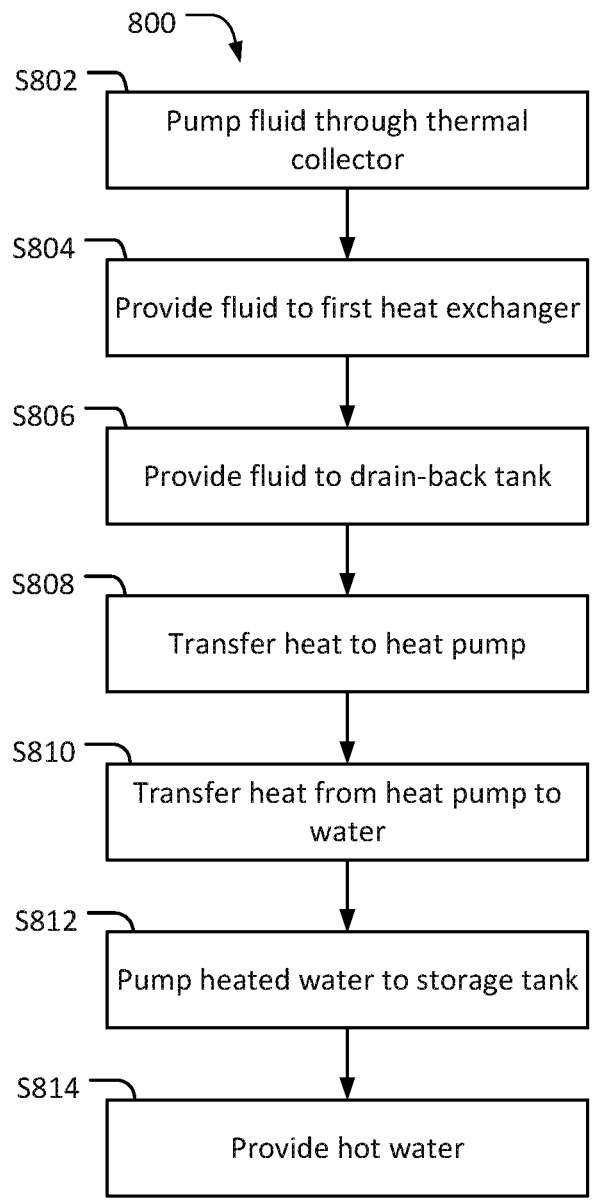
FIG. 10 illustrates a process of solar thermal assisted heating.

FIG. 10 illustrates an embodiment of a process 800 of solar thermal assisted heating. In an embodiment, one or more of the steps of process 800 is performed by executing instructions by a processor of the controller 126, and the instructions may be stored on a non-transitory computer readable medium in the controller. The instructions may be hardware instructions that are stored on a computer-readable medium such as an ASIC or EEPROM, or software instructions that are stored on a memory such as RAM or NAND flash memory.

Fluid is pumped through thermal collector 102 by solar pump 108 at S802. The fluid may be stored by drain-back tank 110 before it is delivered to the thermal collector. The solar pump 108 may be a variable-speed pump that can adjust the fluid velocity to optimize transfer from a PV panel to the thermal collector.

After passing through thermal collector 102, heated fluid is provided to the first heat exchanger 114 at S804. The same pump activity that circulates the fluid through the thermal collector may pump the fluid to the heat exchanger. After passing through the heat exchanger, the fluid is provided to the drain-back tank 110 at S806. Heated fluid may be provided to the drain-back tank even when the heat pump is not in operation to store the heated fluid for future extraction of heat from the fluid.

Heat is transferred from the fluid to the heat pump at S808. The heat transfer may be facilitated by circulating a refrigerant through the heat pump that transfers heat from the first heat exchanger 114 in an evaporation phase of the heat pump, condenses the heated refrigerant gas, and transfers heat from the condensed refrigerant to a second heat exchanger 128 or to water stored in a water tank at S810. In an embodiment with a separate hot water storage tank, water heated by the heat exchanger is pumped to the storage tank at S812. The water is then provided to a user at S814. In an embodiment, providing heated water to a user includes mixing heated water stored in a hot water storage tank with tap water to provide water at a predetermined temperature. In an embodiment, some or all of the heat used to heat the water is provided by heat transfer from the water heated by the thermal collector, and electricity is provided by a PV panel. Elements of process 800, including operating pumps, may be performed by a controller 126.

In an embodiment, the controller 126 may include control logic to activate equipment in the system 100 when certain conditions are present. The system may monitor four temperature sensors 116 that monitor respective temperatures in the drain-back tank 110, the thermal collector 116, water storage tank 138, and the heat pump 120. In an exemplary embodiment, depending on the values from the sensors 116, the controller 126 may operate in one of five modes—a Standby mode, a Prime mode, a Solar mode, a Heat Pump mode, and a Backup Heating mode. More than one mode can occur at a time.

The controller 126 may monitor the following conditions to determine which modes should be active: 1) a solar temperature differential between a temperature of the thermal collector 102 and the drain-back tank 110, 2) a solar flow threshold, 3) efficiency of the heat pump 120, and 4) temperatures of fluids and equipment to ensure that temperatures do not exceed or fall below safe operating thresholds. For example, temperature of fluid in the drain-back tank 110 may be monitored to ensure that the fluid does not freeze, and temperature in the thermal collector 102 may be measured to prevent fluid that exceeds limits of the equipment from being introduced into the system.

Prime mode may be activated when a temperature signal from the thermal collector 102 exceeds a temperature signal from the drain-back tank 138 by a threshold value such as 10° F. or 4° C. In prime mode, the controller 126 may activate solar pump 108 at 100% speed. When a flow sensor on the solar return line reaches a predetermined solar flow threshold, Prime mode may end, and a Solar mode activation condition may be satisfied.

Solar mode may be activated when the Prime mode is complete, the solar temperature differential is above a threshold value, and the temperature of fluid in the drain-back tank is below a maximum operating threshold temperature. When Solar mode is active, bypass valve 105 is opened so that fluid flows from the thermal collector 102 to the drain-back tank 110. In Solar mode, the flow rate of pump 108 may be lowered from 100% to a predetermined level such as 75% of maximum power to conserve energy and extend the life of the pump.

Solar mode may be deactivated when the solar differential temperature falls below a threshold value, or when a flow rate through the solar loop falls below a threshold value. When Solar mode is deactivated, bypass valve 105 may be closed so that fluid flows between the drain-back tank 110 and heat exchanger 114, bypassing the thermal collector 102.

The conditions for activating Heat Pump mode may be met when the temperature of water in storage tank 116 is below a threshold value, the temperature of fluid in drain-back tank 110 is above a threshold value, and the controller 126 determines that an efficiency of operating the heat pump 120 is above a threshold value. The controller 126 activates storage pump 130 in Heat Pump On mode. In an embodiment, the controller 126 may determine the efficiency of the heat pump 120 based on a temperature of input and output fluids, a temperature of the heat pump itself, an amount of energy that is being used by the heat pump, etc.

The conditions for deactivating Heat Pump mode may be met when the controller 126 determines that the heat pump efficiency is below a threshold value, the temperature of water in storage tank 138 exceeds a threshold value, or the temperature of fluid in drain-back tank 110 is below a threshold value. In an embodiment, the controller 126 may deactivate storage pump 130 when the Heat Pump mode is off when the storage pump 130 is not used to provide heated water from an on-demand heater 144 incorporated in the potable water loop.

The conditions for Backup Heating may be met when the controller 126 determines that an efficiency of operating the heat pump 120 is below a threshold value and water temperature in storage tank 138 is below a threshold value. Storage pump 130 is deactivated in Backup Heating mode, and water may be heated by a backup heat source such as a resistive electrical heater or a natural gas burner. The threshold efficiency value used to determine whether to activate the heat pump 120 or a backup heating source may be based on a comparison of the efficiency of the heat pump to the efficiency of the backup heating source. In such an embodiment, the heat pump 120 may only be used when it is more efficient than the backup heating source.

When a conventional storage tank 138 is coupled to system 100, the controller 126 may send a signal to activate an electrical or gas heating system that is provided with the storage tank 138. In another embodiment, an on-demand electrical or natural gas heater 144 may be provide in the potable water loop, and water that is heated by the on-demand heater may be provided to the storage tank 138 by storage pump 130. The on-demand heater 144 may be provided in enclosure 132, or may be provided separately from system 100.

The Standby mode is a default mode that takes place when the none of the conditions are met to run the other modes described above.

In terms of the control logic described above, bypass valve 105 may be activated when Heat Pump mode is active and Solar mode is inactive. When bypass valve 105 is active, the flow rate for solar pump 108 may be reduced to a predetermined level, e.g. less than 25% of maximum flow rate, to circulate fluid between the drain-back tank 110 and heat exchanger 114.

Embodiments of the present disclosure may provide substantial benefits in comparison to conventional water heating systems and heat pumps. For example, embodiments of the present disclosure may use water or treated water as a heat transfer fluid for a PVT array, minimizing the complexity and skill required to install the system. Water is much more efficient than air as a heat transfer medium, so systems of the present disclosure are more efficient than conventional heat pump water heaters, which use air transfer. Embodiments of the present disclosure may heat water without volatilizing any hydrocarbon materials and using only a 110V to 120V electric source, or in some cases, using only solar power.

Additional advantages compared to heat pump water heaters include the stand-alone nature of systems of the present disclosure, which are generally less complex, smaller, and much easier to install than heat pump systems designed to heat or cool large indoor spaces. Using solar radiation as a heat source is significantly more effective than using ambient heat in the air, water or ground. A heat pump of the present disclosure provides a cooling effect to the PV panels, increasing their efficiency, and the PV panels may offset the amount of purchased or grid electricity used to run the heat pump's compressor. Accordingly, embodiments of the present disclosure have a mutually beneficial relationship with PV panels—the thermal collector makes use of waste heat from a PV panel, and simultaneously cools the PV panel by transferring that heat to a hot water storage tank, thereby increasing the efficiency of the PV panel.

Embodiments of the present disclosure are compact, fitting into common spaces for water heaters. Installation is similar to conventional water heaters, lowering the barrier to entry for installers, as well as reducing the cost and risks associated with installation. Embodiments of the present application may have about a fifty percent reduction in greenhouse gasses vs. conventional air source hot water systems. Operation of an embodiment may be substantially quieter than a more conventional air-source heat pump system due to elimination of a fan and locating pumps and the condenser inside of an insulated enclosure. In some embodiments, recovery time is improved by using phase change materials to supplement energy stored by the system.

What is claimed is:

1. A solar thermal assisted water heating system comprising:
- a thermal collector comprising a plurality of fluid channels configured to collect heat from a surface of a photovoltaic module;
- a drain-back tank coupled to the thermal collector;
- a first pump coupled to the drain-back tank and configured to pump fluid from the drain-back tank to the thermal collector;
- a first heat exchanger configured to receive the fluid from the thermal collector;
- a heat pump coupled to the first heat exchanger and configured to remove heat from the fluid and to heat water with the removed heat;
- a bypass valve configured to prevent the fluid pumped by the first pump from flowing through the thermal collector when the bypass valve is active; and
- a controller configured to activate the bypass valve when a temperature difference between the thermal collector and the drain-back tank is below a first threshold value.

2. The system of claim 1, further comprising:
- a second heat exchanger coupled to the heat pump and configured to transfer heat from the heat pump to water.

3. The system of claim 2, wherein the drain-back tank, the first pump, the first heat exchanger, the heat pump and the controller are all disposed in a single enclosure.

4. The system of claim 3, further comprising a second pump configured to pump the water from the second heat exchanger to a water storage tank, wherein the second pump is disposed in the single enclosure.

5. The system of claim 4, wherein the controller, the heat pump and the first and second pumps are powered by electricity from the photovoltaic module.

6. The system of claim 1, wherein the controller is configured to optimize system efficiency based on historic usage patterns, and configured to communicate with an electrical utility and execute instructions from the electrical utility to balance a load on an electric grid.

7. The system of claim 1, further comprising a hot water storage tank,
- wherein the drain-back tank, the first pump, the first heat exchanger, the heat pump, the controller and the hot water storage tank are all disposed in a single enclosure.

8. The system of claim 1, wherein the drain-back tank is insulated to an R-value of at least 4 and configured to store heated fluid, and the drain-back tank is configured as a thermal battery to store heat for use when environmental temperatures decrease.

9. The system of claim 1, further comprising:
- a first temperature sensor coupled to the thermal collector; and
- a second temperature sensor coupled to the drain-back tank,
- wherein the temperature of the thermal collector is measured by the first temperature sensor.

10. The system of claim 9, wherein the temperature difference is a temperature of the first temperature sensor minus a temperature of the second temperature sensor.

11. The system of claim 1, wherein the controller is further configured to activate the first pump to transfer heat from fluid stored in the drain-back tank to the first heat exchanger while the bypass valve is activated.

12. The system of claim 10, wherein the controller is further configured to deactivate the bypass valve to collect heat from the thermal collector when the temperature difference between the thermal collector and the drain-back tank is greater than a second threshold value.

13. The system of claim 1, wherein the controller is further configured to activate a backup heat supply to provide hot water to a hot water tank when a temperature of the drain-back tank is less than a threshold value.

14. The system of claim 1, wherein the controller is further configured to activate a backup heat supply when an efficiency of the heat pump falls below a threshold value.

15. A solar thermal assisted water heating system comprising:
- a thermal collector configured to collect heat from the environment and provide the heat to a fluid within the thermal collector;
- a drain-back tank coupled to the thermal collector;
- a first pump coupled to the drain-back tank and configured to pump the fluid from the drain-back tank to the thermal collector;
- a bypass valve configured to prevent fluid pumped by the first pump from flowing through the thermal collector when the bypass valve is active;
- a first heat exchanger configured to receive the fluid from the thermal collector;
- a heat pump coupled to the first heat exchanger and configured to remove heat from the fluid and to heat water with the removed heat; and
- a controller configured to control the first pump, the heat pump and the bypass valve,
- wherein the controller is configured to activate the bypass valve when a temperature of the fluid in the drain-back tank is less than a temperature of the fluid in the thermal collector by a first threshold value.

16. The system of claim 15, further comprising a second heat exchanger coupled to the heat pump and configured to transfer heat from the heat pump to water,
- wherein the drain-back tank, the first pump, the first heat exchanger, the heat pump and the controller are all disposed in a single enclosure.

17. The system of claim 16, further comprising a second pump configured to pump the water from the second heat exchanger to a water storage tank, wherein the second pump is disposed in the single enclosure.

18. The system of claim 15, wherein the drain-back tank is insulated to an R-value of at least 4 and configured to store heated fluid when the fluid is not circulating between the thermal collector and the heat pump.

19. The system of claim 15, wherein the controller is further configured to deactivate the bypass valve and pump fluid through the thermal collector when the temperature of fluid in the thermal collector minus the temperature of fluid in the drain-back tank is greater than a second threshold value.

20. The system of claim 15, wherein the controller is further configured to activate the first pump and the heat pump to transfer heat from fluid stored in the drain-back tank to a hot water storage tank while the bypass valve is activated.

* * * * *